Patented June 5, 1951

2,556,146

UNITED STATES PATENT OFFICE 2,556,146

DI-(BETA-HYDROXYALKYL)-2-(ALKYL CARBAMYL-OXY)-ALKYLAMINES

Robert T. Olsen, Belvidere, N. J., assignor to General Aniline & Film Corporation, New York, N. Y., a corporation of Delaware No Drawing. Application November 5, 1948, Serial No. 58,611

2 Claims. (Cl. 260—482)

The present invention relates to water-soluble, amino-alkyl carbamates and to a method of producing the same.

Many methods have been proposed in the past for the preparation of compounds within the general class of aminoalkyl carbamates. These involve, for instance, the reaction of an acyl halide and an amine as per U. S. P. 2,432,049, the reaction of an alkylamino alcohol consecutively with phosgene and ammonia as per U. S. P. 2,374,367, and the reaction of an aryl isocyanate with an alkylamino alcohol in pursuance of U. S. P. 2,137,042 and 2,409,001.

The value of these and other similar proposals suffer greatly from the facts that the intermediates used in the processes involved are difficult to procure, and the products resulting from such processes are water-insoluble. Because of such water-insolubility, the field of application of the products is greatly curtailed.

I have now discovered that water-soluble aminoalkyl carbamates in which a carbamyl group is linked to an amino group through an alkyl ether group and having a wide field of industrial application can be expeditiously prepared in extremely high yields by reacting an hydroxyalkylamine with an alkyl- or aryl-isocyanate.

Such water-soluble aminoalkyl carbamates and their preparation as above constitute the purposes and objects of the present invention.

The water-soluble aminoalkyl carbamates contemplated herein may be graphically represented by the following formulae:

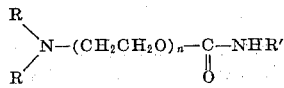

and

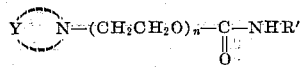

wherein R is hydroxyalkyl or hydroxy polyalkyloxyalkyl, $n$ is a whole number, i. e., 1 or more, Y represents the radicals necessary to complete a five or six-membered saturated heterocyclic nitrogenous nucleus or

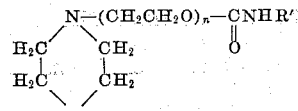

and R' is alkyl or aryl.

The products are prepared by heating equimolar quantities of an hydroxyalkylamine of the formula:

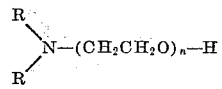

or

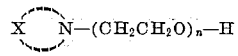

wherein R and $n$ have the values given above, and X represents the radicals necessary to complete a saturated five or six-membered nitrogenous heterocyclic nucleus or represents the grouping:

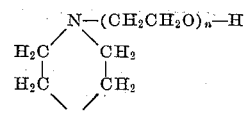

with an alkyl- or aryl-isocyanate. The reaction, which is one of addition, may be represented by the following formula in which R, R' and $n$ have the values given above:

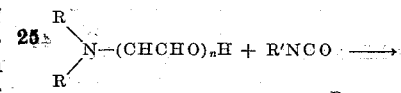

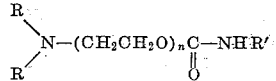

The temperature at which the reaction takes place may vary but it is generally within the range of from about 40 to 100° C. The reaction takes place by mixing the reactants and where necessary subjecting them to heat to bring them within the aforestated temperature. On cooling, the carbamates solidify and may be recovered in a yield approximating 100% of theory.

Examples of hydroxy alkylamines which may be utilized are triethanolamine, N-β-hydroxyethyl morpholine, N-β-hydroxyethyl piperazine, N-β-hydroxyethyl pyrrolidine, N-β-hydroxyethyl-2-methyl piperidine, N-β-hydroxyethyl tetrahydroquinoline, the addition product of ammonia with more than 3 mols of ethylene oxide, the addition product of morpholine with 10 mols of ethylene oxide, the addition product of piperidine with 20 mols of ethylene oxide, the addition product of pyrrolidine with 15 mols of ethylene oxide, the addition product of piperazine with 25 mols of ethylene oxide, and the like. The aforestated addition products of the amines with ethylene oxide may be conveniently prepared by the methods described in U. S. P. 1,970,578.

Suitable alkyl isocyanates for producing the carbamates by reaction with the hydroxy alkyl-amines are methyl isocyanate, ethyl isocyanate, n-butyl isocyanate, octyl isocyanate, dodecyl isocyanate, octadecyl isocyanate, and the like. Examples of aryl isocyanates which have been found to be effective are phenyl isocyanate, α-naphthyl isocyanate, β-naphthyl isocyanate, p-diphenyl isocyanate, and the like. The isocyanates are prepared by the conventional method of reacting phosgene with the desired amine salt, i. e., the hydrochloride in an inert solvent or diluent.

The animonalkyl carbamates contemplated herein have a wide field of technical application, i. e., as surface active agents, pharmaceuticals and biocides. The activity of the compounds as surface active agents may be modified, if desired, by reacting the hydroxyl groups thereof with ethylene oxide to impart even greater water solubility to the carbamates.

The invention is further explained by the following examples, but it is to be understood that the invention is not restricted thereto.

*Example 1.—Di-(β-hydroxyethyl)-2-(octadecyl-carbamyl-oxy)-ethyl amine*

In a 125 ml. Erlenmeyer flask was placed 59.2 grams (.2 mol) of n-octadecyl isocyanate and 29.6 grams (.2 mol) of triethanolamine. The mixture became hot spontaneously from the exothermic reaction. After thorough mixing, the contents were cooled to form a waxy product. The solid forms foamy solutions with hot water. The yield was 89 grams, or 100% of the theoretical.

*Example 2.—2-(octadecylcarbamyl-oxy)-ethyl morpholine*

In a 125 ml. Erlenmeyer flask was placed 59.2 grams (.2 mol) of octadecyl isocyanate and 26.2 grams (.2 mol) of N-β-hydroxy-ethyl morpholine. The reactants were well mixed and heated over a flame to about 60° C. An exothermic reaction occurred. After the reaction mixture had been kept warm for about fifteen minutes, the mixture was cooled to give 85.4 grams of crystalline product, or 100% of the theoretical. A small amount was recrystallized from acetone, yielding a product of melting point 54–55° C.

Analysis: C, 69.68; H, 11.44; ash, trace.
Calcd.: C, 70.34; H, 11.81.

*Example 3.—Di-(β-hydroxyethyl)-2-(phenylcar-bamyl-oxy)-ethylamine*

In a 200 ml. 3-necked flask equipped with a stirrer, dropping funnel and thermometer was placed 14.9 grams (.1 mol) of triethanolamine. With good stirring, there was added over one hour 11.9 grams (.1 mol) of phenyl isocyanate. The reagent was added at such a rate that each drop was well mixed in before the next addition. The temperature spontaneously rose to 42° C. when two-thirds of the isocyanate had been added. The temperature was raised to 70° C. to reduce the viscosity and the rest added dropwise. The reaction mixture was stirred at 90° C. for 15 minutes and cooled. The product, a yellow viscous liquid, weighed 26.8 grams, 100% of the theoretical.

*Example 4*

The procedure is the same as in Example 1 excepting there is used .2 mol of butyl isocyanate in lieu of the octadecyl isocyanate. The characteristics of the products are similar to those of the product of Example 1.

*Example 5*

The procedure is the same as in Example 1 excepting that the triethanolamine is replaced by the addition product of 1 mol of piperazine with 25 mols of ethylene oxide. A di-ester is obtained which is very effective as a wetting, cleansing and emulsifying agent.

The biocidal effect of the products is illustrated by the following examples.

*Example 6*

The product of Example 1 is utilized as a fungicide according to the slide germination technique described by S. E. A. McCallan et al. in Contribution of the Boyce Thompson Institute, 4, 233 (1932), 9, 249 (1938), 10, 329 (1939), 12, 49 (1941), 12, 431 (1942). The organism employed was *Sclerotinia fructicola*.

The result of the test showed 59% germination at 0.001%.

*Example 7*

The same product was tested as a mothproofing agent while operating as follows: Five carpet-beetle larvae were maintained in a Petri dish containing a 1½ inch square patch of wool broadcloth containing about 1% by weight of the material to be tested. After 30 days the appearance of the cloth was noted, mothproofing action being indicated if the cloth shows no visible damages.

The result of this test showed that all the larvae were alive after the 30 day period and that only very slight damage had been done to the cloth.

Various modifications of the invention will occur to persons skilled in this art, and I therefore do not intend to be limited in the patent granted except as necessitated by the appended claims.

I claim:
1. Di-(beta-hydroxyalkyl)-2-(alkyl carbamyl-oxy)-alkylamine.
2. Di-(β-hydroxyethyl) - 2 - (octadecyl carbamyl-oxyl)-ethyl-amine.

ROBERT T. OLSEN.

REFERENCES CITED

The following references are of record in the file of this patent:

UNITED STATES PATENTS

| Number | Name | Date |
|---|---|---|
| 1,970,578 | Schoeller | Aug. 21, 1934 |
| 2,033,740 | Rider | Mar. 10, 1936 |
| 2,089,985 | Ruigh | Aug. 17, 1937 |
| 2,137,042 | Christiansen | Nov. 15, 1938 |
| 2,161,615 | Dietrich | June 6, 1939 |
| 2,187,823 | Ulrich et al. | Jan. 23, 1940 |
| 2,293,494 | De Groote | Aug. 18, 1942 |
| 2,374,367 | Major et al. | Apr. 24, 1945 |
| 2,409,001 | Shelton | Oct. 8, 1946 |
| 2,075,230 | Schatz | Mar. 30, 1947 |
| 2,432,049 | Swan | Dec. 2, 1947 |

OTHER REFERENCES

Gardner et al.: Jour. Amer. Chem. Soc., vol. 55 (1933), pp. 3823–3824.

Cheney et al.: Jour. Amer. Chem. Soc., vol. 64 (1942), pp. 970–973.

Kitchen et al.: Org. Chem., vol. 8 (1943), pp. 338–341.